Aug. 19, 1924.   1,505,094
H. HEINRICH
ROTARY ENGINE, PUMP, AND THE LIKE
Filed March 20, 1918   3 Sheets-Sheet 1

Inventor:
Hugo Heinrich

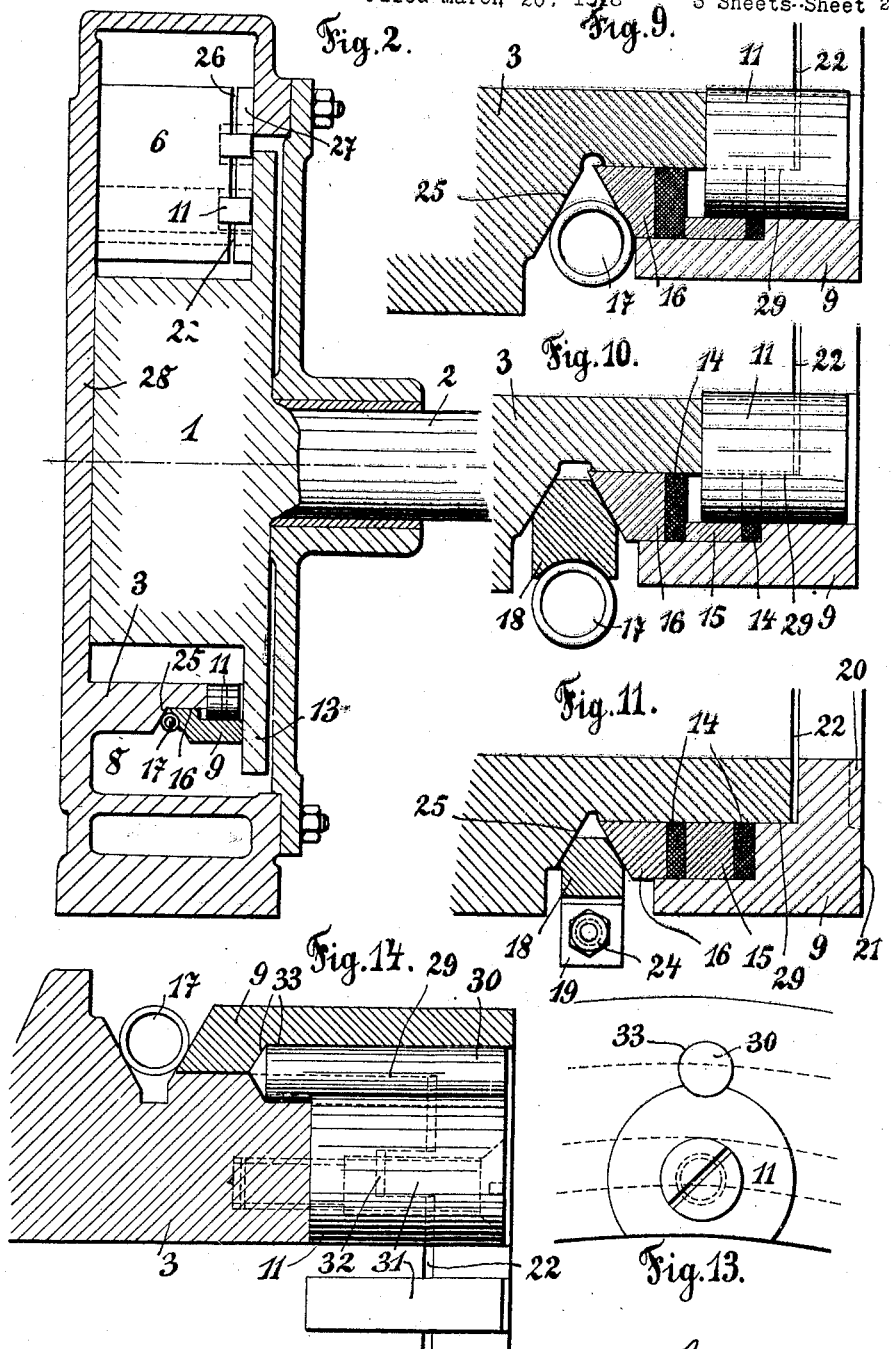

Aug. 19, 1924.  
H. HEINRICH  
1,505,094  
ROTARY ENGINE, PUMP, AND THE LIKE  
Filed March 20, 1918     3 Sheets-Sheet 3

Inventor:
Hugo Heinrich
by [signature] Atty

Patented Aug. 19, 1924.

1,505,094

UNITED STATES PATENT OFFICE.

HUGO HEINRICH, OF ZWICKAU, GERMANY.

ROTARY ENGINE, PUMP, AND THE LIKE.

Application filed March 20, 1918. Serial No. 223,665.

(GRANTED UNDER THE PROVISIONS OF THE ACT OF MARCH 3, 1921, 41 STAT. L., 1313.)

*To all whom it may concern:*

Be it known that I, HUGO HEINRICH, a citizen of the Republic of Germany, and residing at Zwickau, German Republic, have invented certain new and useful Improvements in or Relating to Rotary Engines, Pumps, and the like (for which I have filed applications in Germany, one, August 25, 1915, patented under No. 298,160, and another July 15, 1916, patented under No. 311,944), of which the following is a specification.

My invention relates to rotary engines which can be used as a prime mover, a rotary pump or the like, and has for its object to provide efficient packing means. In engines having a rotating cylinder or piston within a stationary cylinder, the packing between the two cylinders is of particular importance for the reason that a double steam-tight joint is required e. g. in the direction of the engine shaft and in the direction of the circumference. Packing members must not exert too high a pressure in order to avoid too great a friction.

The principal feature of the invention resides in that the joint between the packing and its holder is divided by means of special members for the purpose of preventing the driving medium (steam, compressed air or the like) from passing from the pressure chamber over to the suction chamber.

Figure 1:
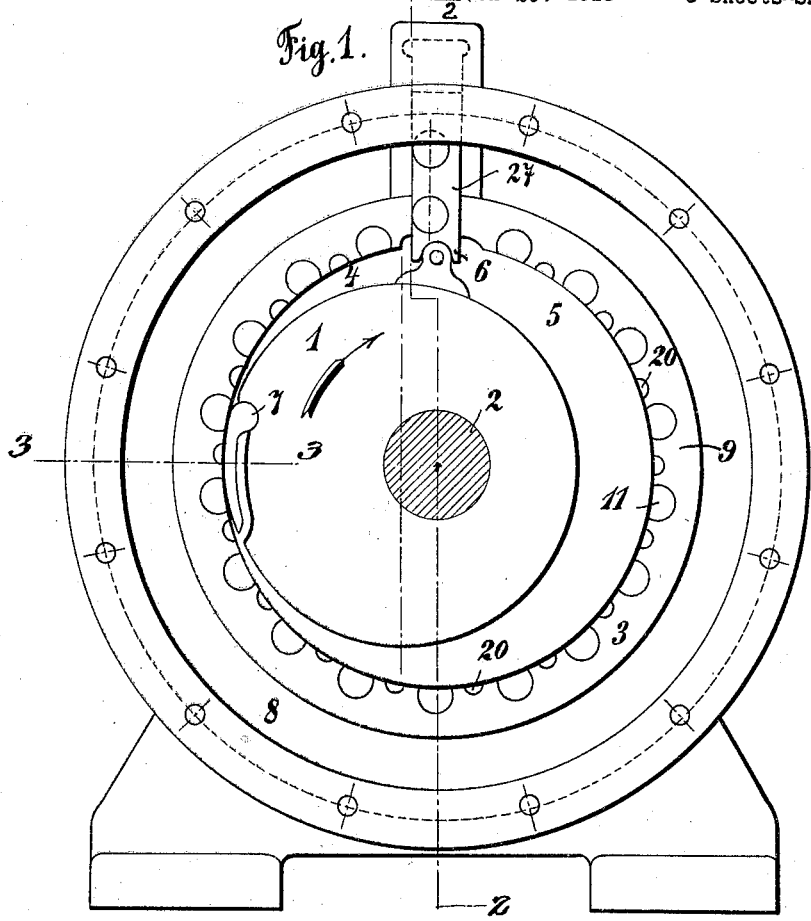
Figure 3:
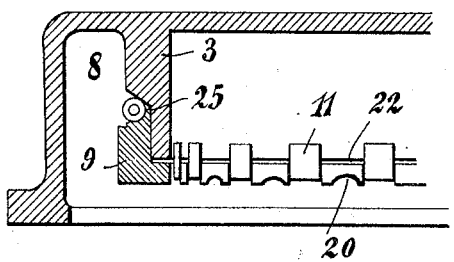
Figure 6:
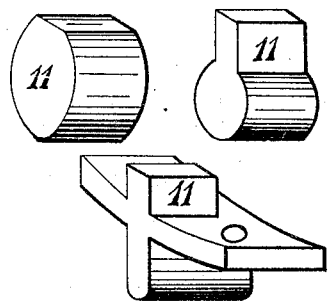
Figure 4:
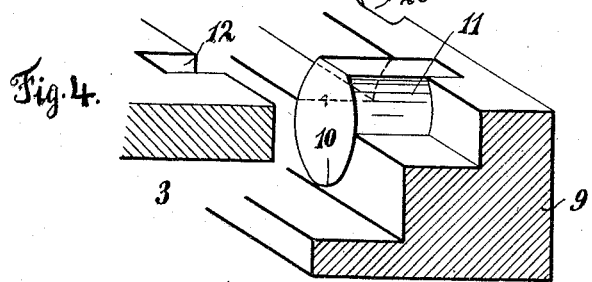
Figure 5:
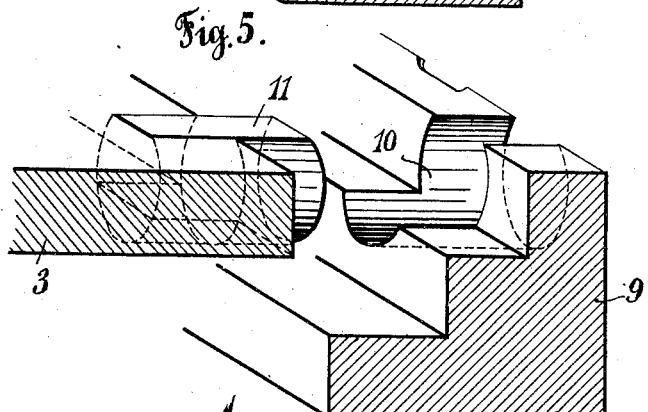
Figures 7, 8:
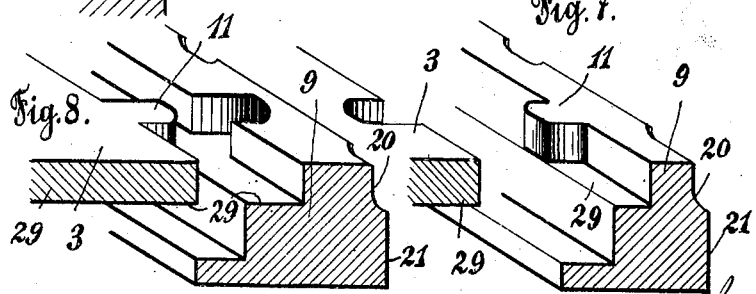

In the accompanying drawing showing by way of example several embodiments of the invention:

Fig. 1 is a side-elevation of the engine with the front plate removed and the shaft shown in section; Fig. 2 is a vertical section along line 2—2 on Fig. 1 and Fig. 3 a longitudinal section along line 3—3 in Fig. 1; Fig. 4 is a cross-sectional view of the packing member (which must be understood to be of annular form and, therefore, will hereafter be called the packing ring) and the adjacent part of the engine, both in perspective illustration; Fig. 5 is a similar view showing a modification; Fig. 6 shows in perspective various forms of the said special members referred to; Figs. 7 and 8 are perspective sectional views of modified constructions of the packing ring shown in Fig. 4 and Figs. 9 to 12 are sectional views of modifications showing particular packing members; Fig. 13 is an end view of a further modification and Fig. 14 a sectional view thereof.

According to Figs. 1 and 2, 1 is the cylindrical piston and 2 the shaft which rotate together. During the rotation, the piston 1 remains in contact with the inner wall of the stationary cylinder 3.—4 and 5 are respectively the compression and exhaust spaces in the cylinder 3.—6 is the abutment and 7 a contact member provided on piston 1 and held in place by a pin. The spaces 4 and 5 must have a steam-tight resilient packing, with relation to the space 8 of the outer casing and the projecting flange 13 of piston 1.

Another packing must be provided at the place of contact between the member 7 and the inner wall of cylinder 3.

The packing against the flange 13 of the piston 1 consists in a packing ring 9, preferably of angular cross-section, which forms a tight joint between the spaces 4, 5 and the wall of the space 8 of the casing. This packing ring 9 is provided with members 11 adapted to enter corresponding recesses 12 in the stationary cylinder 3. These members 11 may be integral with the ring 9, Fig. 7, or they may be provided on the cylinder 3, in which case the recesses 12 are provided in the ring 9, or they may be individual members, as shown in Figs. 4 to 6, adapted to be inserted in pockets 10 in the ring 9 so as to allow of easy exchange when worn out. The distance between two adjacent members depends upon the width of the contact member 7 of the piston 1.

The shape of the members 11 is not essential, it being, however, necessary that if made separate, they are prevented from becoming displaced in a radial direction from their positions. To this end, the members can be given a special shape which will fixedly hold them in position, or they may be secured by screws, or the like. On the other hand, the members 11 must allow of a free play of the packing ring 9 relative to the cylinder 3 in the direction towards the flange 13 of the cylinder 1.

So as not to have to depend on accurate shop-work, one or several packing rings 14 may be inserted behind the ring 9, to prevent any leakage. Between the various packing rings 14 expansion rings 15 may be arranged. The members 11 partly overlap the expansion rings, as shown in Figs. 9 and 10.

Figs. 9 to 12 illustrate several ways of packing. In all these embodiments, the innermost ring 16, which I call the pressure ring, has a double purpose, to wit, it serves as a member for receiving pressure and transmitting the same to the packing rings 14 and rings 15, and it serves as a means for pressing the packing ring 9 against the flange 13 to thereby produce a steam-tight engagement between the parts in contact. The means for producing the required pressure may be of any suitable kind. In the construction shown in Figs. 2 and 9, an adjustable spiral tubular spring 17 held under tension acts directly on a wedge face of the innermost packing ring 16.

According to Fig. 10, a wedge ring 18 (composed of several segments) is inserted between the innermost ring 16 and the annular spring 17. In lieu of the latter, a compressing ring 19, Fig. 11, may be employed. Said ring, 19, consists of a flat iron band, the ends of which are bent outwards and have holes to allow of contracting the ring by suitable means, e. g. a screw bolt and nut 24.

Figure 12:
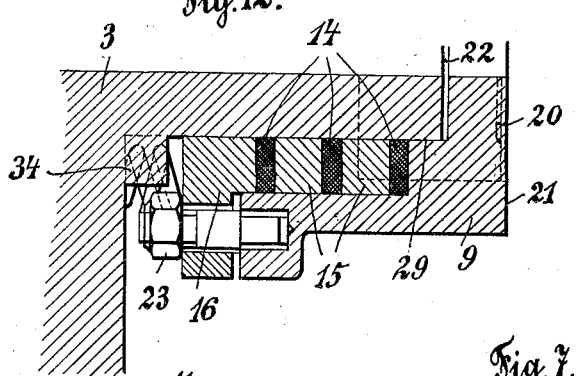

In the modification shown in Fig. 12, the packing rings 14, 15 are compressed by means of screw bolts and nuts 23 while the packing ring 9 is pressed towards the flange 13 by separate springs 34 or by the active agent (steam etc.) or by both combined.

A similar packing as the one above described is provided for the abutment 6. To this end, the abutment is provided with a recess 26 to receive therein a packing member 27. Across the joint between the member 27 and the abutment 6, there extend also members 11 such as shown in Fig. 6.

The shape and size of the members 11 are not essential. According to Figs. 3 to 5 and 9 to 12, the members are of such size or shape that the joint 22 is completely overlapped and the members extend beyond the joint 22 between the ring 9 and the stationary cylinder 3. However, the outer faces of the members 11 may lie flush with the joints 29, as shown in Figs. 7 and 8, or may not even extend that far, (Figs. 13 and 14). To prevent in the latter case the driving medium from passing through the free space thus formed, auxiliary members 30, preferably cylindrical, may be inserted in holes 33 which are bored in the line where the parts 3, 9 and 11 meet. These members 30 which are suitably spaced apart, have a double purpose, to wit, they serve as a means to close the said free space and as a means to secure the members 11 in their positions.

In case of the engine operating at high pressures, it may be desirable to subdivide the joint 22 radially by means of one or several tongues 31 provided in the ring 9 to engage corresponding grooves 32 in the counter part, Fig. 14. By this arrangement the high pressure is prevented from acting directly on the packing joint 29.

What I claim is:

1. In a rotary engine, a rotary cylinder, a stationary cylinder, a packing ring between said cylinders, said stationary cylinder and packing ring being provided with coacting recesses and members, the members arranged to cross the joint between the packing ring and the stationary cylinder.

2. In a rotary engine, a rotary cylinder, a stationary cylinder, a packing ring between the said cylinders, the said stationary cylinder and packing ring being provided with coacting recesses and members, the said members arranged to cross the joint between the said packing ring and the said stationary cylinder, and a resilient means between the said packing ring and the said stationary cylinder.

3. In a rotary engine a rotary cylinder, a stationary cylinder, and a packing means comprising a packing ring having a tapered or wedge face, a part of the stationary cylinder having a tapered or wedge face, and a pressure member mounted to act on said two wedge faces.

4. In a rotary engine, a rotary cylinder, a stationary cylinder and a packing means comprising a packing ring, packing strips therein and expansion rings between said strips, a pressure ring having a tapered or wedge face, a part of the stationary cylinder having a wedge face, and a pressure member mounted and acting on said wedge faces.

5. In a rotary engine, a rotary cylinder, a stationary cylinder, and a packing means comprising a packing ring having a tapered or wedge face, a part of the stationary cylinder having a tapered or wedge face, a pressure member mounted to act on said two wedge faces, and a wedge-ring inserted between the wedge faces and the said pressure member.

6. In a rotary engine, a rotary cylinder, a stationary cylinder, and a packing means comprising a packing ring, packing strips therein, and expansion rings between them, a pressure ring having a tapered or wedge face, a part of the stationary cylinder having a wedge face, a pressure member mounted and acting on said wedge faces, and a wedge ring inserted between the wedge faces and the said pressure member.

7. In a rotary engine, a rotary cylinder, a stationary cylinder, and a packing means comprising a packing ring of angular cross-section adapted to be placed between a part of the rotary cylinder and a part of the stationary cylinder, members and corresponding recesses in the packing ring and in the said part of the stationary cylinder, packing strips, and expansion rings between said strips, and a pressure ring.

8. In a rotary engine, a rotary cylinder, a stationary cylinder, and a packing means comprising a packing ring of angular cross-section and adapted to be placed between a part of the rotary cylinder and a part of the stationary cylinder, a resilient means between the said packing ring and the said part of the stationary cylinder, members in the packing ring and corresponding recesses in the said part of the stationary cylinder, packing strips held by said packing ring, and expansion rings between said packing strips, and a pressure ring.

9. In a rotary engine, a rotary cylinder, a stationary cylinder, and a packing means comprising a packing ring adapted to be placed between a part of the rotary cylinder and a part of the stationary cylinder, members and corresponding recesses in the said packing ring and in the said part of the stationary cylinder packing strips enclosed by said packing ring expansion rings between said strips, a pressure ring, and a spiral ring of tubular shape to exert pressure on the said packing elements and the said packing ring.

10. In a rotary engine, a rotary cylinder, a stationary cylinder, and a packing means comprising a packing ring of angular cross-section and adapted to be placed between a part of the rotary cylinder and a part of the stationary cylinder, members in the packing ring, and corresponding recesses in the said part of the stationary cylinder, packing strips placed in said packing ring, and expansion rings between said strips, a pressure ring, and a tubular spiral spring to exert pressure on the said packing elements and the said packing ring.

11. In a rotary engine, a rotary cylinder, a stationary cylinder, a packing means comprising a packing ring of angular cross-section and adapted to be placed between a part of the rotary cylinder and a part of the stationary cylinder, and members and corresponding recesses in the said packing ring and in the said part of the stationary cylinder, packing strips nested in said packing ring, and expansion rings between said strips, a pressure ring, and a wedge ring for transmitting pressure.

12. In a rotary engine, a rotary cylinder, a stationary cylinder, a packing means comprising a packing ring of angular cross-section and adapted to be placed between a part of the rotary cylinder and a part of the stationary cylinder, a resilient means between the said packing means and the said part of the stationary cylinder and members in the packing ring and corresponding recesses in the said part of the stationary cylinder, packing strips placed in said packing ring, and expansion rings between said strips, a pressure ring, and a wedge ring for transmitting pressure.

13. In a rotary engine, a rotary cylinder, a stationary cylinder, a packing means comprising a packing ring of angular cross-section, members and corresponding recesses arranged in the parts to cross the joint between the two cylinders, packing strips provided in the packing ring, and expansion rings between said strips, a pressure ring, a wedge ring, and an annular spiral spring too exert pressure on the packing elements.

In testimony whereof I have affixed my signature in presence of two witnesses.

HUGO HEINRICH.

Witnesses:
 RUDOLPH FRICKE,
 THELKA FRICKE.